United States Patent [19]

Kowalski et al.

[11] Patent Number: 4,777,025

[45] Date of Patent: Oct. 11, 1988

[54] PROCESS FOR MAKING PHOSPHORUS PENTOXIDE OF DIMINISHED REACTIVITY

[75] Inventors: Werner Kowalski, Weilerswist; Theo Dahmen, Brühl; Hans Haas, Swisttal; Günther Schimmel, Erftstadt, all of Fed. Rep. of Germany

[73] Assignee: Hoechst Aktiengesellschaft, Fed. Rep. of Germany

[21] Appl. No.: 37,985

[22] Filed: Apr. 13, 1987

[30] Foreign Application Priority Data

Apr. 25, 1986 [DE] Fed. Rep. of Germany ....... 3614041

[51] Int. Cl.$^4$ ............................................. C01B 25/12
[52] U.S. Cl. .................................................... 423/304
[58] Field of Search ......................................... 423/304

[56] References Cited

U.S. PATENT DOCUMENTS

| | | | |
|---|---|---|---|
| 2,907,635 | 10/1959 | Tucker | 423/304 |
| 2,988,426 | 6/1961 | Cross et al. | 423/304 |
| 3,034,860 | 5/1962 | McCullough | 423/304 |
| 3,077,382 | 2/1963 | Klein et al. | 423/304 |
| 4,219,533 | 8/1980 | Hartlapp et al. | 422/232 |
| 4,713,228 | 12/1987 | Shute et al. | 423/304 |

FOREIGN PATENT DOCUMENTS 1292032 6/1961 France ................................ 423/304

Primary Examiner—John Doll
Assistant Examiner—Wayne A. Langel
Attorney, Agent, or Firm—Connolly and Hutz

[57] ABSTRACT

Hexagonal phosphorus pentoxide of diminished reactivity is made by burning liquid yellow phosphorus with a mixture of dry air and pure oxygen inside a combustion zone with the resulting formation of a gas stream containing phosphorus pentoxide; next, the gas stream coming from the combustion zone is passed initially through an intermediary zone indirectly cooled by means of fluidized matter and then through a condensing zone fitted with an immersion tube indirectly cooled by means of fluidized matter; the gas stream is passed through the immersion tube at a mean temperature of 450° to 600° C. and allowed to remain in the immersion tube over a period of 2 to 5 seconds.

3 Claims, 1 Drawing Sheet

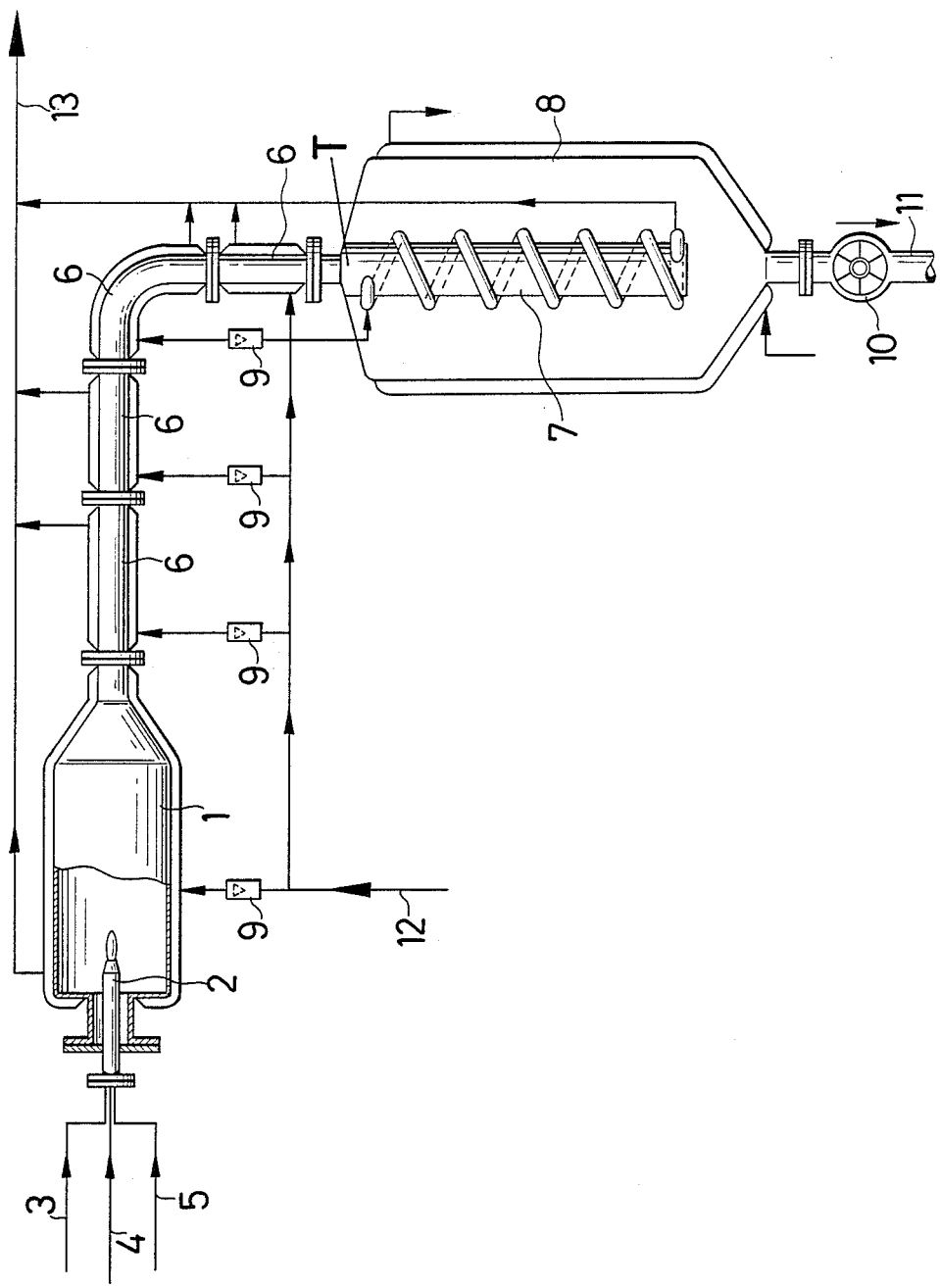

PROCESS FOR MAKING PHOSPHORUS PENTOXIDE OF DIMINISHED REACTIVITY

The present invention relates to a process for making hexagonal phosphorus pentoxide of reduced reactivity by separating it from a phosphorus pentoxide-containing gas stream produced from liquid yellow phosphorus and a dry oxygen-containing gas inside a combustion zone, the hexagonal phosphorus pentoxide being separated in a condensing zone provided with a water-cooled immersion tube downstream of the combustion zone.

Phosphorus pentoxide is known to exist in three crystalline modifications, namely in two orthorhombic modifications (so-called O- or O'-modification) which react vary reluctantly, and in a hexagonal modification (so-called H-modification) which reacts violently with water.

Phosphorus pentoxide which is to be reacted with an alcohol to give a phosphoric acid ester should conveniently be $P_4O_{10}$ of little activity in order to avoid side reactions which occur under heavy evolution of heat and give the ester an undesirable brown coloration; in clear contrast with this, it is good practice to use $P_4O_{10}$ of high reactivity whenever phosphorus pentoxide is employed in an organic condensation reaction. It is therefore necessary to have phosphorus pentoxide of different reactivity for the various uses it is put to.

U.S. Pat. No. 3,077,382 discloses a process for making phosphorus pentoxide the reactivity of which varies between the reactivity of the little reactive orthorhombic modification and that of the commercial $P_4O_{10}$-grades in H-modification. In this process, a hot phosphorus pentoxide-containing oxide-containing gas stream is passed through a fluidized bed of monomeric $P_4O_{10}$-particles maintained at temperatures between 90° and 365° C., to effect the condensation of phosphorus pentoxide from the gas stream.

As disclosed in an application filed earlier (German Patent Application P No. 35 02 705.3), it is possible for the reactivity of hexagonal phosphorus pentoxide to be reduced by subjecting it inside a rotary tube, through or tray kneader or heat exchanger provided with a conveyor and mixing screw to annealing treatment at temperatures between 200° and 390° C.

A disadvantage which is associated with this postannealing treatment of phosphorus pentoxide resides in the need to use expensive structural elements and considerable energy.

The present invention now provides a process for making phosphorus pentoxide with little structural and energetic expenditure, wherein phosphorus pentoxide of adjustable reactivity is separated from a phosphorus pentoxidecontaining gas stream produced from liquid yellow phosphorus and dry oxygen-containing gas inside a combustion chamber, the separation being effected in a condensing zone fitted with a water-cooled immersion tube and arranged downstream of the combustion zone. To this end, the invention provides for the oxygen-containing gas to comprise a mixture of air and pure oxygen; for the phosphorus pentoxide-containing gas stream coming from the combustion zone to be initially passed through an intermediate zone cooled with fluidized matter and then through the condensing zone; for the gas stream passing through the immersion tube to have a mean temperature of 450°–600° C.; and for the gas stream to remain in the immersion tube over a period of 2 to 5 seconds.

Further preferred and optional features of the process of this invention provide:

(a) for the oxygen-containing gas to contain air and pure oxygen in a ratio by volume of from (0.7–1):1;
(b) for the fluidized matter to be flowing water;
(c) for the water to be used at a temperature of from 10° to 30° C., preferably 18° to 25° C.;
(d) for the intermediary zone to be subdivided into a plurality of separately coolable sections;
(e) for the gas stream flowing through the immersion tube to have a mean temperature of from 470°–500° C.;
(f) for the period during which the gas stream is allowed to remain in the immersion tube to be prolonged by reducing the ratio by volume of air to pure oxygen in the oxygen-containing gas used for burning the yellow phosphorus, and inversely.

Phosphorus pentoxide-containing gas which is very rapidly cooled in contact with cold surfaces to about 350° C. gives loose, little flowable and highly reactive hexagonal $P_4O_{10}$, whereas a gas stream cooled in accordance with this invention to temperatures of 450° to 600° C. gives hexagonal $P_4O_{10}$ of distinctly reduced reactivity.

The process of this invention can be carried out using an apparatus substantially the same as that disclosed in U.S. Pat. No. 4,219,533 shown diagrammatically in the accompanying drawing.

With reference to the drawing:

A combustion chamber 1 is provided with a spray nozzle 2 opening into it which is connected with conduits (3, 4, 5) for the supply of air, liquid yellow phosphorus and oxygen. The combustion chamber 1 is connected with its end opposite the spray nozzle 2 to an off-gas outlet 6 comprised of a plurality of individual sections, and through this latter to an immersion tube 7 having a temperature meter T secured to its upper end portion. A watercooled condensing chamber 8 provided with an outlet 11 closable at its lower end by means of a bucket wheel 10 is arranged to surround the immersion tube 7 so as to be radially spaced therefrom.

A plurality of branch pipes provided with flow meters 9 is arranged to run from cooling water main pipe 12 to the jackets surrounding combustion chamber 1 and the various sections of off-gas tube 6, and to the cooling coil of immersion tube 7. Further branch pipes are arranged to run from the jackets of combustion chamber 1 and the various sections forming off-gas pipe 6 and from the cooling coil of immersion tube 7 so as to open into line 13 recycling cooling water.

The volume of the phosphorus pentoxide-containing gas is an important parameter in the process of this invention. As can be seen from the drawing, the liquid yellow phosphorus can be burned using pure oxygen, air or a mixture of these two components. The larger the quantity of air introduced into the combustion zone, additionally to the quantity of oxygen needed for the combustion of yellow phosphorus, the larger the volume of the gas containing phosphorus pentoxide and the shorter the residence time of the gas inside the immersion tube so that only a small portion of $P_4O_{10}$ is separated from the gas in the immersion tube whereas the larger portion of it is separated in the condensation zone.

This is the reason why $P_4O_{10}$ generally of higher activity comes from the outlet of the condensing chamber. In view of this, the gas quantity should be so selected that the residence time inside the immersion tube is not less than 2 seconds. On the other hand, however, it is necessary, in the event of the phosphorus pentoxide-containing gas having a small volume, to prevent the deposition of an excessive quantity of material in the immersion tube, covering and in the end insulating the cooling surface of the tube. If so insulated, the gas stream containing phosphorus pentoxide is naturally subject to insufficient cooling and the orthorhombic $P_4O_{10}$-modification simultaneously commences separating; as a result $P_4O$ of undue low reactivity is ultimately taken from the outlet of the condensing chamber. It is therefore good practice to select the gas quantity so that the residence time inside the immersion tube does not exceed 5 seconds.

The process of this invention which provides for the intensity of the cooling in the intermediary zone to be varied by appropriately selecting the quantity of cooling water flowing through the various sections forming the off-gas tube, and for the volume of the gas stream containing phosphorus pentoxide to be varied by appropriately selecting the quantity of additional air admitted to the spray nozzle, permits $P_4O_{10}$ of the physical structure targeted and hence of the chemical reactivity targeted to be made.

The following Examples illustrate the invention which is naturally not limited thereto. The $P_4O_{10}$ obtained in each particular case was tested for its reactivity substantially as disclosed in U.S. Pat. No. 3,077,382 (cf. column 6, lines 33 through 47). To this end, 150 ml kerosene (containing less than 1% aromatic substances) dried with phosphorus pentoxide was placed at 22°–24° C. in a 500 ml Dewar and 20 g phosphorus pentoxide to be tested was added. The blend was stirred over a period of 30 s by means of a cross-blade agitator rotating at a speed of 600 rpm. Next, 100 ml ethyl hexanol of 22°–24° C. was added while stirring was continued.

The temperature measured in the suspension by means of a feeler was communicated to an x, y-writer and plotted against time. The time between the rise from 5° C. to 30° C. was graphically determined and the reaction coefficient $$R = 25/t \ [°C./s]$$

calculated therefrom.

EXAMPLE 1

(Prior Art)

The apparatus was as shown in the drawing, but the jackets of three sections forming off-gas tube 6 were left free from cooling water.

100 l/h ($\simeq$170 kg) liquid yellow phosphorus was burned with 680 m³ dry air under a pressure of 5 bars inside combustion chamber 1 which was substantially cylindrical. The gas containing phosphorus pentoxide entered immersion tube 7 at a temperature of 900° C. and left it with a temperature of about 680° C. Inside condensing chamber 8, the gas was cooled suddenly. Hexagonal $P_4O_{10}$ was found to deposit on the walls of condensing chamber 8. The $P_4O_{10}$ taken through outlet 11 had a reactivity of 5.6° C./s and a hexagonal structure.

EXAMPLE 2

(Comparative Example)

The apparatus of Example 1 was used but 33 m³/h cooling water at 23° C. was passed through the jackets of the three sections forming off-gas tube 6.

100 l/h liquid yellow phosphorus was burned in combustion chamber 1 with 1200 normal m³ (S.T.P.) dry air. During the combustion of the yellow phosphorus in accordance with the equation

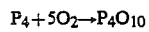

$$P_4 + 5O_2 \rightarrow P_4O_{10}$$

153 normal m³ oxygen was consumed so that the $P_4O_{10}$ produced was contained in a gas quantity of 1200−153=1047 normal m³.

The immersion tube had a length of 5000 mm and a diameter of 500 mm; its cross-sectional area accordingly was 0.196 m² and its volume 0.98 m³.

The $P_4O_{10}$-containing gas had a temperature of 600° C. within the upper region of immersion tube 7 (metering point T) and a temperature of 400° C. at the tube outlet; the mean temperature inside the tube was about 500° C.

As follows, the dry gas volume of 1047 normal m³/h corresponded to about 2960 operational m³/h or 0.82 operational m³/second.

The mean residence time of the $P_4O_{10}$-containing gas in the immersion tube accordingly was 0.98:0.82=1.2 second. The $P_4O_{10}$ separated in condensing chamber 8 was of hexagonal structure and had a reactivity of 5.8° C./s.

EXAMPLE 3

(Comparative Example)

The apparatus was the same as that used in Examples 1 and 2, but 9 m³ cooling water at 23° C. was passed through the jacket of each of the three sections forming off-gas tube 6, i.e. altogether 27 m³.

100 l/h liquid yellow phosphorus was burned in combustion chamber 1 with a dry gas mixture consisting of 1000 normal m³ air and 100 normal m³ oxygen. The $P_4O_{10}$ so produced was contained in a gas quantity of 1100−153=947 normal m³.

The $P_4O_{10}$-containing gas in the immersion tube had a temperature of 586° C. at metering point T and of 397° C. at the tube outlet; the mean temperature in the immersion tube was about 492° C.

As follows, the dry gas volume of 947 normal m³/h corresponded to a volume of about 2560 operational m³/h or 0.73 operational m³/second.

The mean residence time of the $P_4O_{10}$-containing gas in the immersion tube accordingly was 0.98:0.73=1.3 second.

The $P_4O_{10}$ separated in condensing chamber 8 was of hexagonal structure and had a reactivity of 4.7° C./second.

EXAMPLE 4

(Invention)

The apparatus fed with cooling water of Example 3 was used.

100 l/h liquid yellow phosphorus was burned in combustion chamber 1 with a dry gas mixture consisting of 650 normal m³ air and 100 normal m³ oxygen. The $P_4O_{10}$ so produced was contained in a gas quantity of 750−153=597 normal m$^3$.

The $P_4O_{10}$-containing gas in immersion tube 7 had a temperature of 580° C. at metering point T and of 396° C. at the tube outlet; the mean temperature in the immersion tube was about 488° C.

As follows, the dry gas volume of 597 normal m$^3$/h corresponded to a volume of about 1670 operational m$^3$/h or 0.46 operational m$^3$/second. The mean residence time of the $P_4O_{10}$-containing gas in the immersion tube accordingly was 0.98:0.46=2.13 seconds.

The $P_4O_{10}$ separated in condensing chamber 8 was of hexagonal structure and had a reactivity of 3.4° C./s.

EXAMPLE 5

(Invention)

The apparatus was the same as that used in Examples 1 and 2, but 8 m$^3$ cooling water at 23° C. was passed through the jacket of each of the three sections forming off-gas tube 6, i.e. altogether 24 m$^3$.

100 l/h liquid yellow phosphorus was burned in combustion chamber 1 with a dry gas mixture consisting of 350 normal m$^3$ air and 200 normal m$^3$ oxygen. The $P_4O_{10}$ so produced was contained in a gas quantity of 550−153=397 normal m$^3$.

The temperature of the $P_4O_{10}$-containing gas in immersion tube 7 was 610° C. at metering point T and 399° C. at the tube outlet; the mean temperature inside the immersion tube was about 505° C.

As follows, the dry gas volume of 397 normal m$^3$/h corresponded to a volume of about 1140 operational m$^3$/h or 0.32 operational m$^3$/second.

The mean residence time of the $P_4O_{10}$-containing gas in the immersion tube accordingly was 0.98:0.32=3.06 seconds.

The $P_4O_{10}$ separated in condensing chamber 8 was of hexagonal structure and had a reactivity of 1.9° C./second.

EXAMPLE 6

(Invention)

The apparatus was the same as that used in Example 5, charged with cooling water.

100 l/h liquid yellow phosphorus was burned in combustion chamber 1 with a dry gas mixture consisting of 200 normal m$^3$ air and 250 normal m$^3$ oxygen. The $P_4O_{10}$ so produced was contained in a gas quantity of 450−153=297 normal m$^3$.

The temperature of the $P_4O_{10}$-containing gas in immersion tube 7 was 560° C. at metering point T and 384° C. at the tube outlet; the mean temperature in the immersion tube was about 472° C.

As follows, the dry gas volume of 297 normal m$^3$/h corresponded to a volume of about 820 operational m$^3$/h or 0.23 operational m$^3$/second.

The mean residence time of the $P_4O_{10}$-containing gas in the immersion tube accordingly was 0.98:0.23=4.3 seconds.

The $P_4O_{10}$ separated in condensing chamber 8 had a reactivity of 1.6° C./second.

EXAMPLE 7

(Comparative Example)

The apparatus was the same as that used in Examples 1 and 2 but 4.5 m$^3$ cooling water at 23° C. was passed through the jacket of each of the three sections forming off-gas tube 6, i.e. altogether 13.5 m$^3$.

100 l/h liquid yellow phosphorus was burned in combustion chamber 1 with a dry gas mixture consisting of 350 normal m$^3$ air and 200 normal m$^3$ oxygen. The $P_4O_{10}$ so produced was contained in a gas quantity of 550−153=397 normal m$^3$.

The temperature of the $P_4O_{10}$-containing gas in immersion tube 7 was 805° C. at metering point T and 560° C. at the tube outlet; the mean temperature inside the immersion tube was about 682° C.

As follows, the dry gas volume of 397 normal m$^3$/h corresponded to a volume of about 1400 operational m$^3$/h or 0.39 operational m$^3$/second.

The residence time of the $P_4O_{10}$-containing gas in the immersion tube accordingly was 0.98:0.39=2.5 seconds.

The $P_4O_{10}$ separated in condensing chamber 8 was of hexagonal structure and had a reactivity of 3.6° C./second.

EXAMPLE 8

(Comparative Example)

The apparatus was the same as that used in Example 3, charged with cooling water.

100 l/h liquid yellow phosphorus was burned in combustion chamber 1 with a dry gas mixture consisting of 500 normal m$^3$ air and 200 normal m$^3$ oxygen. The $P_4O_{10}$ so produced was contained in a gas quantity of 700−153=547 normal m$^3$.

the temperature of the $P_4O_{10}$-containing gas in immersion tube 7 was 500° C. at metering point T and 310° C. at the tube outlet; the mean temperature inside the immersion tube was about 405° C.

As follows, the dry gas volume of 547 normal m$^3$/h corresponded to a volume of about 1370 operational m$^3$/h or 0.38 operational m$^3$/second.

The mean residence time of the $P_4O_{10}$-containing gas in the immersion tube accordingly was 0.98:0.38=2.6 seconds.

The $P_4O_{10}$ separated in condensing chamber 8 had a reactivity of 1.8° C./second.

After an operational period of 90 hours, glassy orthorhombic $P_4O_{10}$ commenced overgrowing the inlet of immersion tube 7; as a result, there was a rise in pressure in combustion chamber 1 necessitating a production stoppage.

We claim:

1. A process for making hexagonal phosphorus pentoxide of diminished reactivity which comprises: burning liquid yellow phosphorus with an oxygen-containing gas mixture consisting essentially of dry air and pure oxygen in a ratio by volume of from (0.7–1):1 inside a combustion zone with the resultant formation of a gas stream containing phosphorus pentoxide; passing the gas stream coming from the combustion zone initially through an intermediary zone subdivided into a plurality of separately coolable sections and indirectly cooled by means of a flowing cooling medium and then passing it through a condensing zone fitted with an immersion tube indirectly cooled by means of a flowing cooling medium, the gas stream being passed through the immersion tube at a mean temperature of from 450° to 600° C. being allowed to remain in the immersion tube over a period of 2 to 5 seconds, the period being prolonged by reducing the ratio by volume of air to pure oxygen in the oxygen-containing gas mixture used for burning the yellow phosphorus, and inversely.

2. The process as claimed in claim 1, wherein the gas stream flowing through the immersion tube has a mean temperature of from 470° to 500° C.

3. The process as claimed in claim 1, wherein the cooling medium is water having a temperature of from 10° to 30° C.

* * * * *